Aug. 20, 1940.　　　　F. E. FISHER　　　　2,212,395
CLUTCH MECHANISM
Filed Oct. 24, 1936　　　3 Sheets-Sheet 1
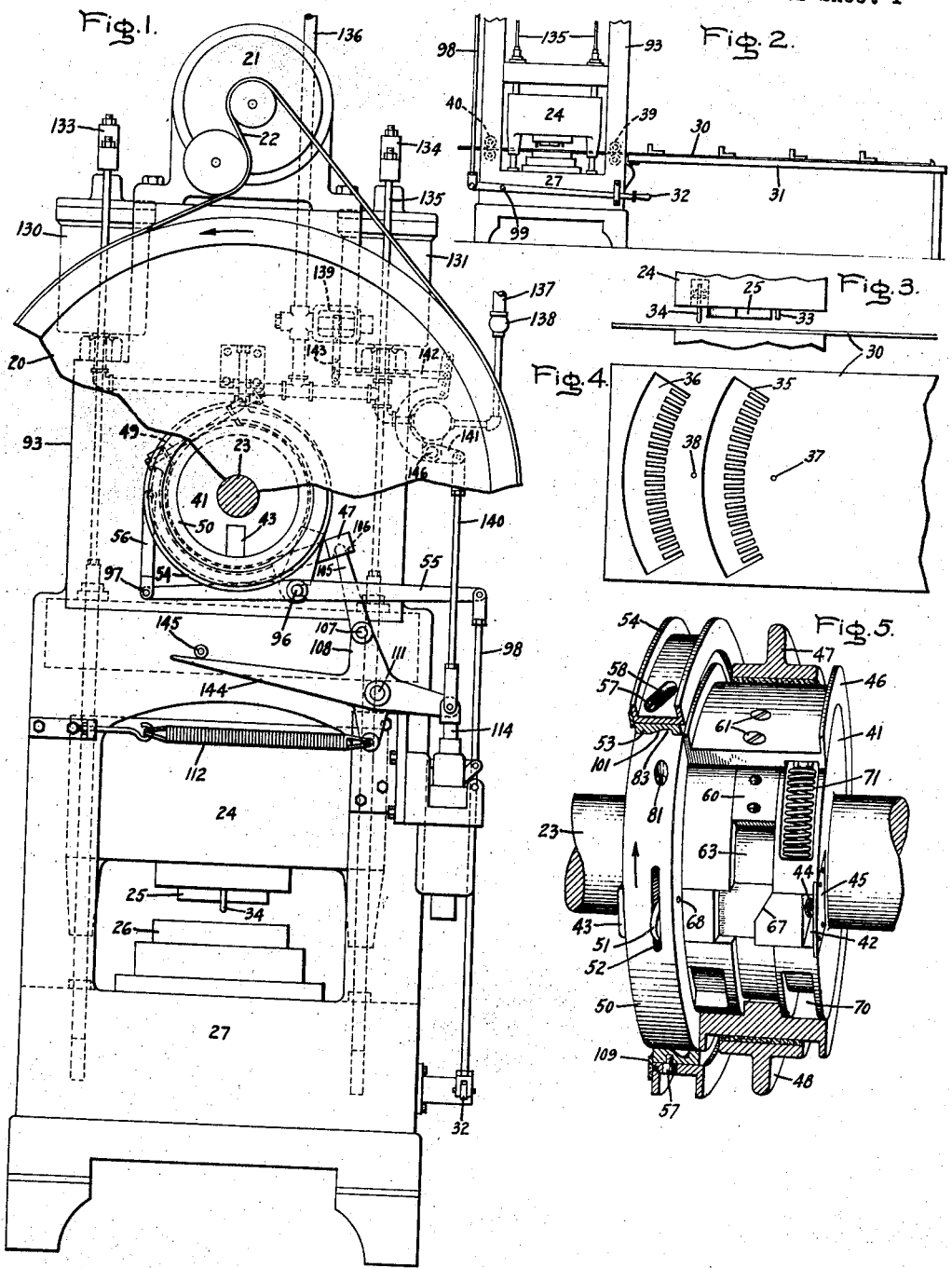
Inventor:
Frederick E. Fisher,
by Harry E. Dunham
His Attorney.

Aug. 20, 1940.    F. E. FISHER    2,212,395
CLUTCH MECHANISM
Filed Oct. 24, 1936    3 Sheets-Sheet 2
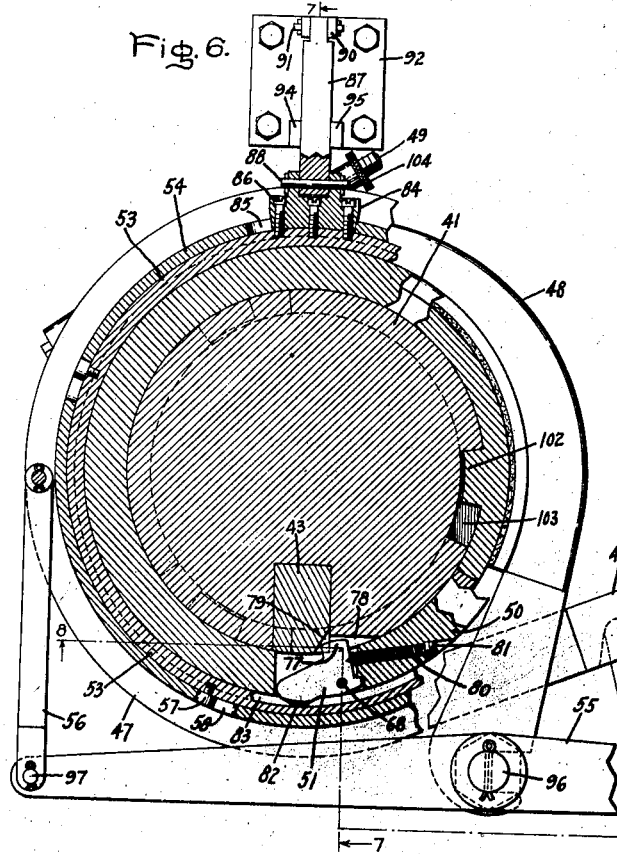
Inventor:
Frederick E. Fisher,
by Harry E. Dunham
His Attorney.

Aug. 20, 1940.  F. E. FISHER  2,212,395
CLUTCH MECHANISM
Filed Oct. 24, 1936   3 Sheets-Sheet 3
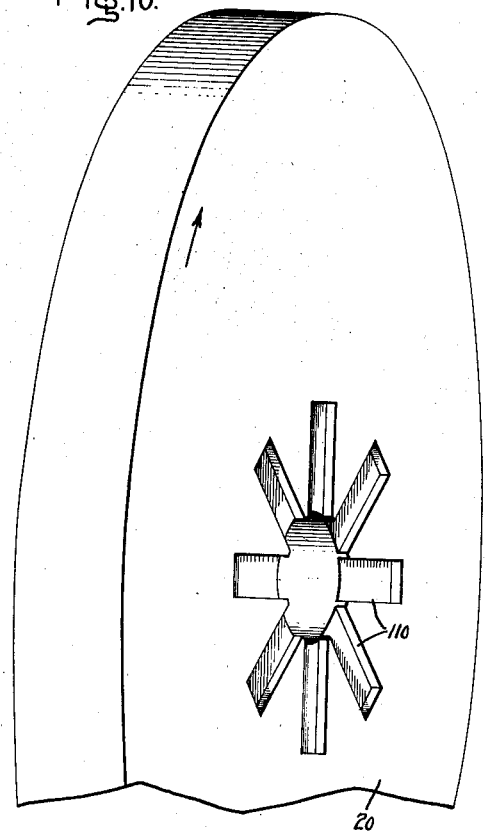
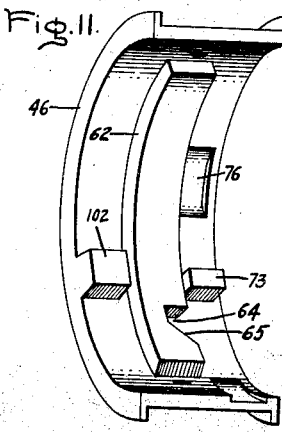
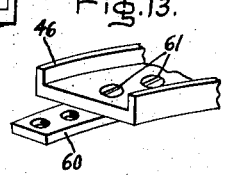
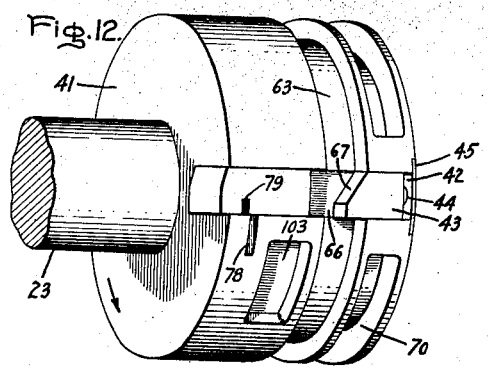
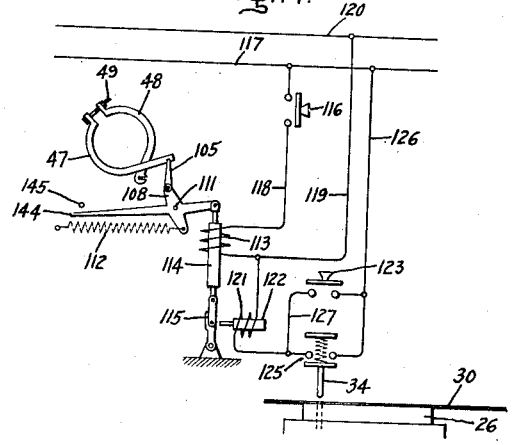
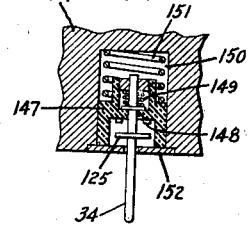
Inventor:
Frederick E. Fisher,
by Harry E. Dunham
His Attorney.

Patented Aug. 20, 1940

2,212,395

UNITED STATES PATENT OFFICE 2,212,395

CLUTCH MECHANISM

Frederick E. Fisher, Scotia, N. Y., assignor to General Electric Company, a corporation of New York Application October 24, 1936, Serial No. 107,392

2 Claims. (Cl. 192—25)

My invention relates to clutch mechanisms, and more particularly to clutches for use in punch presses.

One object of my invention is to provide a clutch mechanism whereby the crank shaft and, therefore, the punch, and the cross head upon which it is mounted may be stopped at any desired point in its stroke.

For a better understanding of my invention, together with other and further objects thereof, reference is had to the following description, taken in connection with the accompanying drawings, and its scope will be pointed out in the appended claims.

In the accompanying drawings Fig. 1 is a side view of a punch press equipped with my improved clutch and safety device; Fig. 2 is a partial front view of the same press shown in smaller scale; Fig. 3 is an enlarged side view of the die shown in Fig. 2 and of a part of the safety device; Fig. 4 is a plan view of a sheet of metal from which two punchings, made by the die of Fig. 3, were taken; Figs. 5, 6, 7, 8 and 9 are sectional views of the clutch mechanism, Fig. 5 being a front perspective view of the clutch mechanism having portions of the outer elements broken away to disclose the hub structure thereunder; Figs. 6 and 9 being sectional views taken along line 6—6 and 9—9 in Fig. 7; and Figs. 7 and 8 being views taken on lines 7—7 and 8—8 in Fig. 6; Fig. 10 is a view of the fly-wheel illustrating the clutch side thereof; Figs. 11, 12 and 13 illustrate in perspective, parts of the clutching mechanism; Fig. 14 is a circuit diagram illustrating the elements of the safety mechanism, and the circuit connections between them, and Fig. 15 is an enlarged view of the automatic control switch used in connection with the electric safety mechanism.

Referring to the drawings in detail, Fig. 1 illustrates a punch press provided with a fly-wheel 20 driven by a motor 21 by means of a belt 22. The fly-wheel is loosely mounted upon a crank shaft 23 which operates a punch or cross head 24. The cross head 24 carries the punching, or male part, 25 of the die. The female part 26 is mounted upon a table 27. This figure further illustrates an end view of the clutching mechanism together with its operating and tripping mechanisms. This mechanism will be explained in connection with the subsequent figures in the drawings.

In Fig. 2, which is a partial, or fragmentary, front view of the press shown in Fig. 1, a sheet of metal 30 is illustrated as being fed into the press from a table 31 which is attached to the right side of the press. A manually operated handle 32 is used for operating the clutch to connect the fly-wheel to the crank shaft, and thereby start operation of the press.

Fig. 3 is an enlarged side view of the male die 25 illustrating a punching member 33 to the right of the die 25 and a guide pin 34 to the left thereof.

Fig. 4 is a plan view of a portion of the sheet 30 having die cut holes 35 and 36 therein, which indicate the shape of the die, together with guide holes 37 and 38. The holes 37 and 38 respectively follow the punched holes 35 and 36, having been respectively punched simultaneously with the holes 35 and 36, into the sheet 30 which is moved to the left between pairs of guide rolls 39 and 40 after each completed stroke of the press. The movement is such that the hole punched by the member 33 on any preceding stroke is moved directly under the pin 34, which is spaced from the die 25 on the side opposite to the side at which member 33 is mounted. When the work sheet 30 is properly alined with the die member 25 subsequent to the punching of the hole 36, the pin 34 will move into the hole 38, in the example of Fig. 3, and thereby permit the completion of the next stroke to punch out holes 35 and 37. If the work is not properly alined the pin 34 which is made longer than the member 33, and therefore projects beyond the surface of the die 25, will be moved upwardly into the cross head 24 and will operate a safety mechanism to stop the movement of the head, before the die 25 touches the sheet 30, in a manner explained later in the specification.

Figs. 5, 6, 7, 8 and 9 are views illustrating the construction of the clutch mechanism built in accordance with my invention. In Fig. 5 an assembly of the driven member of the clutch is illustrated, in perspective, with portions of its parts broken away to better illustrate their construction and relation to each other. This driven member comprises a hub 41 mounted on the crank shaft 23. This hub is not movable relatively to the shaft and is mounted on the shaft 23 between the punch-press frame and the loosely mounted fly-wheel 20 (see Fig. 7) which constitutes the driving member of this clutch mechanism. The hub 41 is provided with a keyway 42 in its periphery in which a bolt 43 is arranged to move parallel to the axis of the crank shaft 23. The bolt 43 is illustrated in this figure, as being in its forward position in which its end projects beyond the fly-wheel end of the hub 41.

It is urged into this position by a spring 44 which is mounted in the end of the key and is held under compression by a plate 45 which closes the back end of the keyway 42. A sleeve 46 is mounted on the hub 41 and may be rotated relatively to the hub by a brake collar 47—48 for the purpose of withdrawing the bolt to release the hub 41 from the fly-wheel. This sleeve and brake collar are illustrated in this figure only in section, so as to show their relationship to the hub 41 and to the bolt 43. Further details thereof are illustrated in Figs. 6, 11, 12 and 13.

Adjacent to the sleeve 46, on the hub 41, a latching mechanism for latching the bolt 43 to its inner, or withdrawn position, is mounted. This mechanism includes a ring 50, which is rigidly mounted on the hub 41, in which a latch 51 is pivotally mounted in a slot 52, a latch operating sleeve 53 slidable on the surface of ring 50 and a flanged collar 54. This sleeve and collar are broken away so as to show the latch 51 in the ring 50. The flanged collar 54 may be turned about the crank shaft axis to a limited extent by a lever 55 and a link 56 illustrated in Figs. 1 and 6 and when so turned it moves relatively to the latch operating sleeve 53 and moves the latter axially or laterally by means of pins 57 mounted in the sleeve 53, and projecting into slots 58 in the collar 54. The slots 58 are straight slots extending between the two edges of the collar 54 and at an angle to the axis of rotation, whereby a rotation of the collar 54 relatively to the sleeve 53 will cause the pins 57, and the sleeve 53, to move the axial or lateral distance between the two ends of the slots 58. This axial movement of the sleeve 53 operates the latch 51 in a manner explained in connection with Figs. 5, 6, 7 and 9.

Further details of the bolt 43 and its operating sleeve 46 may be described by reference to Fig. 5, together with Figs. 11, 12 and 13. The sleeve 46, as may be seen by reference to Figs. 5, 11 and 13, comprises two parts which are substantially alike and are bolted together by keys 60 attached to the respective parts by screws 61. The keys 60 are bolted to the inner surface of the sleeve 46, and when bolted into place, complete an annular key 62 on the inner surface of the sleeve 46. The key 62 is slidably fitted into an annular keyway 63 in the periphery of the hub 41. The annular key 62 is further provided with a notch 64, see Fig. 11, having a side 65 which is arranged at an acute angle to the sides of the key. The bolt 43, which is shown in its forward position in Figs. 5 and 12, is provided with a keyway 66, which is wide enough at its narrowest part to slidably accommodate the key 62 on the under side of the sleeve 46. This keyway is, however, provided with a side 67 which corresponds angularly to the side 65 of the notch 64 in the annular key 62. Therefore, when the notch 64 registers with the bolt 43 the spring 44 will urge the key 43 forward until the side 67 on the bolt keyway 66 touches the side 65 in the notch 64. The movement of the bolt permitted by this arrangement of the notch and keyway is the full movement between the extended and withdrawn positions.

It may be readily seen that when the sleeve 46 rotates relatively to the hub 41 in the direction indicated in Fig. 8, for example, the notch 64 will move away from the bolt 43 and during such movement will force the side 67 of keyway 66 to slide on the side 65 of notch 64 since the two sides are inclined to the direction of rotation and thereby cause the bolt 43 to move back in its keyway 42. The bolt is, in this manner, drawn into the hub and the hub 41 is thereby disconnected from the fly-wheel.

The hub 41 is also provided with several peripheral grooves 70 in each of which a pair of springs 71 and 72 is mounted for the purpose of returning the sleeve 46, when the brake 47–48 is released, to its normal position in which the bolt 43 is free to advance to the position shown in Figs. 5 and 12 when released by the latch 51. The operation of the springs 71 and 72 may be better understood by further reference to Fig. 9. This view is a fragmentary sectional view taken along line 9—9 in Fig. 7. The sleeve 46 is provided with a lug 73 which moves in the peripheral groove 70 and is pressed into one end of said groove by the springs 71 and 72, which are under compression between this lug 73 and the other end of the groove 70. Between springs 71 and 72 a block 74, provided with a roller 75, is mounted for movement in the groove 70 for the purpose of reducing the friction between the springs and the inner surface of the sleeve 46. A groove 76 on the inner surface of the sleeve 46 is provided to facilitate movement of the roller 75.

Figs. 6, 7 and 8 illustrate further views of the latching mechanism, partly described in connection with Fig. 5, whereby the bolt 43 is held in its withdrawn position. Fig. 6 is a sectional end view of the clutching mechanism taken mainly through the center of the operating collar 54 and partly through the sleeve 46 along the line 6—6— 6—6 in Fig. 7. This figure clearly illustrates the latch 51 pivoted upon a pin 68 and provided with a tongue 77 which projects into a slot 78 in the hub 41 and simultaneously into a slot 79 in the bolt 43. A spring 80 mounted in the ring 50 and provided with an adjusting screw 81 urges the latch into this position. When the latch is in this position a tongue 82 thereon projects into a peripheral groove 83 in the inner surface of the operating sleeve 53.

The operating sleeve 53 is not rotatable about the axis of shaft 23 but may be moved axially thereof. The mechanism for preventing this sleeve from turning and yet permitting a limited axial movement thereof is illustrated in Figs. 6 and 7. Fig. 6 illustrates a front view thereof and Fig. 7 illustrates a side view thereof. This mechanism comprises a block 84, projecting through a slot 85 in the collar 54 and attached to the sleeve 53 by screws 86. The block 84 is prevented from movement about the axis of the shaft 23 by a link 87 which is pivoted to the block by a pin 88 and to a guide member 90 by a pin 91. The guide member 90 is attached to a plate 92 which in turn is attached to the body 93 of the punch press. Guide members 94 and 95 also attached to the plate 92 guide the link 87 during its pivotal movement which results in an axial movement of the sleeve 53 but prevent any lateral movement which would result in the rotation of the sleeve 53.

The axial movement of the sleeve 53 is obtained by a slight rotation of the collar 54 by means of the lever 55 and the link 56, see Fig. 1. The lever 55 is pivoted upon a pin 96 which is rigidly mounted in the frame 93 of the punch press. This lever is connected at one end to the link 56 by a pin 97 and at its other end to the manually operated lever 32, shown in Fig. 2, by a rod 98. The collar 54 is provided with slots 58 in which pins 57 on the sleeve 53 are moved when the collar 54 is rotated relatively to the sleeve 53. When the handle end of the lever 32 is lifted it is pivoted about a pin 99 and pulls down the link 98. The link 56 is thereby lifted by the lever 55 which moves about its pivot pin 96 by action of the link 98 so that the collar 54 is given a clockwise rotation. The pins 57 are accordingly forced to move from one end of each slot 58 to the respective other ends thereof which are axially displaced by a distance suitable to obtain the desired axial movement of the sleeve.

As pointed out above, the tongue 82 of the latch 51 projects into the annular groove 83 in the inner surface of the sleeve 53. Since the ring and latch rotate relatively to the sleeve 53 the latch may be positioned at any point along its path of rotation and therefore the groove 83 extends along the entire inner surface of the sleeve 53. This groove 83, a cross-section of which is illustrated in Fig. 7, is further provided with an inclined side 101 which engages the latch tongue 82 during its own axial movement, and moves the tongue into its slot 52 in the ring 50, thereby moving tongue 77 out of the groove 79, unlatching the bolt 43 and permitting the latter to move outwardly.

Fig. 6, as stated above, is taken partially through the sleeve 46 to illustrate a lug 102 loosely mounted in a keyway 103 in the hub 41. This lug 102 is larger than then the spring lug 73 on this same sleeve and takes the shock of stopping the rotation of the hub 41. In other words, when the sleeve 46 is stopped by the brake collar 47, 48, the sleeve turns relatively to the rotating hub 41 until the lug 102 reaches the end of the slot or keyway 103 and stops the hub. Considerable kinetic energy may be developed by this hub and its connected elements and, therefore, this large lug is required to absorb this energy.

The brake collar for the sleeve 46 is shown in greater detail in this figure. The collar actually comprises two parts. The part 47 is the lower half and a part 48 is the upper half of the complete collar. The part 48 is hooked at one end to the pivot pin 96 of the lever 55 which is rigidly mounted in the body 93 of the press and is connected at its other end to the lower half 47 by a pin 49. The length of this pin is adjustable by an adjusting screw 104 so that the proper braking effect may be obtained. The part 47 is held at one end by the pin 49 and its other end projects tangentially away from the sleeve 46 for a short distance and is held in operating position by a link 105, one end of which projects into a pocket 106 in the free end of the part 47 and the other end of which is pivoted by a pin 107 to the tripping lever 108 of the tripping mechanism.

In Fig. 7 a side view of the link 87 which holds the operating sleeve 53 is illustrated. This link 87 being pivoted to member 90 and guided by the members 94, 95 prevents the sleeve 53 from rotating about the axis of the shaft 23 yet permits a limited axial movement which is sufficient to unlatch the bolt 43. This figure also illustrates a sectional view parallel to the crank shaft axis and taken through the latching mechanism along lines 7—7 indicated in Fig. 6. In this sectional view the tongue 77 of latch 51 is illustrated as projecting into the notch 79 in the key 43 and the bolt is therefore in the withdrawn position. In this position of the bolt the keyway 66 in the bolt 43 is alined with the annular key 62 on sleeve 46. In the position illustrated the sleeve 46 has been returned to its normal position by the springs 71 and 72 at which the notch 64 in the annular key 62 registers with the bolt 43, and the bolt 43 is held in the withdrawn position solely by the latch 51. It may be noted here that a plate 109 is attached to the outer edge of the collar 54 and overlaps the edge of the operating sleeve 53 as well as the ring 50, and thereby prevents the lateral displacement of the collar 54 toward the right. The collar is prevented from moving axially in the other direction by the fly-wheel 20 which is closely spaced from this end of the hub 41 as shown in Figs. 7 and 8.

The cross-section of the groove 83 in the sleeve 53 is clearly shown in this figure. The side 101 of this groove is inclined to, or arranged at an acute angle to the surface of the sleeve, so that when the sleeve is gradually displaced relatively to the latch 51 the tongue 82 projecting into the groove 83 is gradually moved into the slot 52 by this inclined side 101.

Fig. 8 is a sectional view along line 8—8 of Fig. 6 looking in the direction of the arrows. This figure illustrates the bolt 43 in its withdrawn position and illustrates the keyway therein alined with the notch in key 62 so that the inclined side 67 of the keyway and the inclined side 65 of the notch are opposite each other. The latch 51 is, however, moved into the notch 79 and prevents the movement of the bolt outwardly.

Fig. 10 illustrates the clutch side of the flywheel 20. This wheel is driven by the belt 22 on the periphery thereof and is loosely mounted on the shaft 23. A series of radially arranged notches 110 in the clutch side of the fly-wheel are provided whereby, when the bolt 43 moves into its outer position, it engages one of these notches and establishes a connection between the fly-wheel 20 and the hub 41.

Fig. 11, as already stated, illustrates one-half of the collar 46. Fig. 13 illustrates only a fragment of the other half of this collar, and the key 60 since the two halves of the collar are substantially alike.

Fig. 12 illustrates a section of the crank shaft 23 and the details of the hub 41 which have been explained in connection with Fig. 5.

In Figs. 14 and 15 I have illustrated a safety device whereby the clutch mechanism, just described, may be operated, manually, to stop the operation of the press at any desired instant during an operating stroke, and automatically whenever the work is not properly alined in the press. In Fig. 14 the brake parts 47 and 48, connected by the pin 49, are diagrammatically shown. The link 105 is in engagement with the end of the brake part 47 and the lever 108 pivoted about a pin 111 is illustrated as being in the position in which the brake is open. The lever 108 is urged clockwise by a spring 112 and counterclockwise by a solenoid 113 and a plunger 114. The solenoid plunger 114 is lifted when the solenoid 113 is energized and when so lifted it is held in that position by a toggle mechanism 115. In this position of the plunger, the brake is off and the bolt 43 may be in either of its two positions. In order to energize the solenoid 113 and obtain the described relation of the elements of the braking mechanism a control switch 116 is provided. When this switch is closed a circuit is established to the solenoid 113 from a conductor 117 through conductor 118 to the solenoid and through conductor 119 to a conductor 120, the conductors 117 and 120 representing a current source.

If the bolt 43 is in its withdrawn position, and it is desired to start the press the hand lever 32 is moved upwardly at its grip end thereby moving the collar 54 clockwise through rod 98, lever 55 and link 56. The sleeve 53 is thereby moved axially, thereby withdrawing the latch 51 and releasing the bolt 43 which is urged forward by the spring 44.

For the purpose of stopping the press, a second solenoid 121 provided with a plunger 122 is provided for tripping the toggle 115. The solenoid may be energized by a manually operated switch 123, or automatically by means of the pin 34 which operates a switch 125. When it is desired to stop the machine manually, the switch 123, which may be in the form of a push button switch, is closed, whereby a circuit is established from conductor 117 through conductor 126, switch 123, conductor 127 to solenoid 121 and back to conductor 120 through conductor 119. The solenoid 121 is thereby energized and by means of its core or plunger 122 collapses the toggle 115, thereby permitting spring 112 to rotate the lever 108 clockwise and thereby apply the brake to the collar 46.

When the brake is so applied, the operating sleeve 48 with its key 62 remains stationary. The fly-wheel 20 and hub 41 continue to rotate together while the bolt 43 moves inwardly due to the inclined surface 67 in the notch 66 moving relatively to the now stationary inclined surface 65 on the key 62. The bolt is fully withdrawn to its latched in position as soon as the two inclined surfaces pass each other. The hub 41 then remains stationary and the flywheel continues to rotate freely.

The operation of the pin 34 and its switch 125 has already been explained. If the pin 34 does not line up with a hole punched by the member 33 upon its previous stroke the pin 34 closes the switch 125 thereby establishing a circuit through the solenoid 121 and again causing a collapsing of the toggle 115 as above explained. This therefore forms a simple and reliable mechanism for tripping the clutch mechanism for the punch press.

In addition to the foregoing mechanisms I also provide means operated simultaneously with the clutch, either by manual means or automatically, for assisting the brake to stop the cross-head 24 and, upon a release of the brake to return the cross-head to its uppermost position. For this purpose I provide two cylinders 130 and 131, see Fig. 1, at the top of the body 93 of the punch press and provide these cylinders with piston-operated cross-arms 133 and 134 which support the cross-head 24 by means of four rods 135 attached respectively to the four corners of the cross-head and to the ends of the cross-arms. Suitable fluid connections such as air conduits 136 and 137 are provided to supply air to the cylinders 130 and 131 at two different pressures. The conduit 136 supplies fluid at a high pressure such as 80 pounds per square inch, for example, and the conduit 137 supplies the same fluid through a pressure reducing valve 138 at a lower pressure, such as 30 pounds per square inch, for example. A suitable valve 139 is provided whereby the high pressure fluid from the conduit 136 is normally shut off and the low pressure fluid from conduit 137 is supplied to the cylinders 130 and 131. This low pressure fluid acts as a cushion for counterbalancing the weight of the cross-head 24. The high pressure fluid is admitted to the cylinders simultaneously with the operation of the clutch for the purpose of assisting the brake 47—48 in stopping the movement of the cross-head. This high pressure fluid remains in the cylinders and upon the release of the brake shoes, returns the cross-head to its upper position, thereby providing room to clear the dies of trouble.

In order to carry out this operation I provide a rod 140 connected to the plunger 114 and through an intermediate lever 141 and a link 142 to the operating arm 143 of the valve 139. When the safety device is tripped, either manually or automatically, the lever 108 is rotated clockwise by the spring 112 until it reaches the position shown in Fig. 1, at which it is prevented from further rotation by a tail piece 144 extending from the lever and engaging a stop member 145 mounted in the framework 93 of the punch press. In this position of the lever 108 the link 105 has been moved upwardly to its uppermost position and the brake collar 47—48 has been tightened. Simultaneously the rod 140 attached to the lever 108 at the same point at which plunger 114 is attached operates the valve 139 through the lever 141, which is pivoted on a pin 146, and the link 142. High pressure fluid from conduit 136 is thereby admitted to the cylinders and the cross-head 24 is instantly stopped. When the brake is then released by operation of the push button 119, the cross-head 24 is returned to its upper position from which its stroke begins. The valve 139 is also operated when the brake is released, but the high pressure in the cylinders continues for the short period required to return the cross-head to its top position.

In Fig. 15, I have shown an enlarged, vertical sectional view of the pin 34 and the switch 125. The pin 34 carries the moving contacts of the switch, and a cup shaped insulating member 147 carries the stationary contacts 148 of the switch. The pin 34 is moved to its outermost position by a spring 149 mounted in the insulating member 147, thereby keeping the contacts of the switch in a normally open position. The cup shaped member 147 is movable in a hole 150 in the cross-head 24 of the punch press. A spring 151 held under compression between the bottom of the hole 150 and the member 147, moves the cup against a plate 152, which closes the end of the hole 150. In operation, when the end of pin 34 engages the misalined sheet of metal, it is moved inwardly until the contacts of the switch 125 are closed. If thereafter the cross-head 24 moves downwardly, an additional distance, the cup-shaped member 147 moves against the spring 151, and thereby moves the whole assembly into the hole 150. This arrangement thereby provides an extremely flexible operating switch for the purpose above described.

When operating the above-described press, the sheet of metal which is to be punched is first placed between the dies and then the handle 32 is lifted. The collar 54 is thereby turned about its axis, and operating sleeve 53 is moved axially to unlatch the bolt 43. The bolt moves forward by pressure of the spring 44, and enters one of the notches 110, thereby connecting the hub 41 to the fly-wheel. At the completion of each stroke, the sheet material is advanced in any convenient manner. When it is desired to stop the press, push button 123 is depressed, or when the sheet material does not properly line up with the die, the pin 134 is depressed. The operation of either push button 123 or the pin 134 energizes the tripping magnet 121 which collapses the toggle 115, and thereby applies the brake to the sleeve 46. A small relative rotation between the sleeve 46 held stationary by the brake 47—48 withdraws the bolt 43 from the fly-wheel which then runs freely, and a simultaneous operation of the valve 139 brings the cross-head 24 to an instantaneous stop. A subsequent operation of the button 116 releases the brake and the cross-head 24 is returned to its original position, and the press is ready for another cycle of operation.

What I claim as new and desire to secure by Letters Patent of the United States, is:

1. In a clutch mechanism, the combination of a driving member and a driven member, a bolt in said driven member normally urged into engagement with said driving member, means for withdrawing said bolt comprising a collar rotatable upon said driven member and arranged to withdraw said bolt by a rotational movement thereof, means for engaging said collar and causing its movement relatively to said driven member during the rotation of said clutch, and means for automatically latching said bolt in its withdrawn position.

2. In a clutching mechanism, the combination of a shaft, a flywheel loosely mounted on said shaft, a hub rigidly mounted on said shaft to rotate therewith, and a bolt mounted in said hub and normally moved into engagement with said flywheel for connecting said shaft to said flywheel, means for withdrawing said bolt to disconnect said hub from said flywheel and latching means for engaging said bolt when withdrawn by said means, said latching means comprising a latching member normally urged into position to retain said bolt in its withdrawn position, a sleeve movable axially, and when so moved, operable to unlatch said bolt, and a collar rotatable relatively so said sleeve and operable to move said sleeve axially to operate said latch and release said bolt.

FREDERICK E. FISHER.

CERTIFICATE OF CORRECTION.

Patent No. 2,212,395.

August 20, 1940.

FREDERICK E. FISHER.

It is hereby certified that error appears in the printed specification of the above numbered patent requiring correction as follows: Page 3, first column, line 28, strike out the word "then"; page 5, second column, line 18, claim 2, for "so" read --to--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.